United States Patent [19]

Bray

[11] 4,081,735
[45] Mar. 28, 1978

[54] MOTION CONTROL SYSTEM FOR AN INDUCTIVELY CONTROLLED MULTI-PHASE MOTOR

[75] Inventor: William Edward Bray, Houston, Tex.

[73] Assignee: Texas Instruments Incorporated, Dallas, Tex.

[21] Appl. No.: 658,794

[22] Filed: Feb. 17, 1976

Related U.S. Application Data

[62] Division of Ser. No. 456,496, Apr. 1, 1974, Pat. No. 3,953,778.

[51] Int. Cl.² .............................................. H02K 37/00
[52] U.S. Cl. .................................... 318/696; 318/227
[58] Field of Search ............... 318/138, 227, 230, 685, 318/696

[56] References Cited

U.S. PATENT DOCUMENTS

| | | | |
|---|---|---|---|
| 3,423,658 | 1/1969 | Barrus | 318/696 |
| 3,757,191 | 9/1973 | Agati et al. | 318/685 X |
| 3,767,993 | 10/1973 | Yablonski | 318/685 |
| 3,789,971 | 2/1974 | Deyesso et al. | 318/685 X |
| 3,849,714 | 11/1974 | Goretzki et al. | 318/685 |

Primary Examiner—Gene Z. Rubinson
Attorney, Agent, or Firm—Rene' E. Grossman; Thomas G. Devine

[57] ABSTRACT

A control system moves an inductively controlled multi-phase motor in a forward or reverse direction. The motion may be in steps or it may be a continuous rotation. Dynamic braking of the rotation in either direction, either in steps or continuous rotation, is achieved by activating one or more phases of the multi-phase motor that lag the selected phase. Detent is accomplished by deactivating the lagging phase or phases at a prescribed time so that the selected rotational phase will then be applied to stop the motor at the desired motor pole.

The speed at which the motor is moving when the lagging phase or phases are selected is measured by a velocity correction circuit that causes more current to be sent through the motor coils associated with the lagging phase or phases when the velocity is high than when it is low.

When the rotation of the motor is continuous and stopping is required, the dynamic braking circuitry continually compares the decaying voltage of a predetermined standard RC time constant circuit with the decaying voltage of a measuring RC time constant circuit that varies in accordance with the velocity of the motor. A comparator circuit compares the two voltages and, until they reach a minimal prescribed difference, causes a current to flow in the motor coils associated with the lagging phase or phases. When a limit is reached, two specified motor phases are selected, one being a lagging phase, the lagging phase being deactivated after a prescribed period of time has elapsed, so that the motor then detents at the prescribed motor pole.

6 Claims, 6 Drawing Figures

MOTION CONTROL SYSTEM FOR AN INDUCTIVELY CONTROLLED MULTI-PHASE MOTOR

This is a division of application Ser. No. 456,496 filed Apr. 1, 1974 now U.S. Pat. No. 3,953,778.

BACKGROUND OF THE INVENTION

1. Field of the Invention

This invention relates generally to the control of an inductively controlled multi-phase motor. More specifically, it relates to the control of a stepper motor whose rotational motion is translated into linear motion.

2. Description of the Prior Art

In the prior art, the braking of an inductively controlled multiphase motor is achieved by measuring time. Typically, a circuit is triggered and the motor activated. At some later time, the braking is applied. This type of braking results in mechanical vibration that is undesirable, and requires sophisticated implementation to work properly. The problems associated with smooth start-up and stopping are not easily overcome when the criterion for such motion is based upon time alone.

In the disclosed system, when the motion is continuous, braking is achieved by applying current to lagging phases in such a way that the stopping of the rotation is accomplished in accordance with an RC time constant voltage detent. When the motor is operated in a stepping fashion, a lagging phase is applied after a desired rotational phase has been selected. The lagging phase is applied for a predetermined time period ending prior to the time required to move from detent to the position desired by the selected phase. Then, the selected phase is again activated so that the motor rotor again detents at the desired pole. In combination with this type of braking is a simplified circuit for causing more or less motor current to flow, as determined by the amplitude of charge on a capacitor when the lagging phase or phases is selected.

BRIEF SUMMARY OF THE INVENTION

Simplified circuitry is used for controlling a stepper motor in a stepping or continuous rotation mode. In the preferred embodiment, the stepper motor drives the thermal printhead of a thermal printing mechanism. Printing is accomplished by applying heat to the printhead in a prescribed fashion, the printhead contacting thermally sensitive paper to produce a desired alphanumeric character. The printing is done when the printhead is moved from left to right. At the end of the print line, the printhead is returned to the left, rapidly, in a "carriage return" mode. The printhead can also be moved to the left in a "back space" mode. When the "carriage return" mode is employed, the stepper motor operates continuously until a prescribed displacement is reached. At that point, two lagging phases are selected. A tachometer system is used to define the position of the motor shaft. A pulse from the tachometer activates a switch circuit such that a measuring RC time constant circuit is completed. The standard time constant circuit is compared to the measuring time constant circuit by a comparator which continues to apply current to sequentially selected lagging phases until the measuring time constant circuit voltage reaches a prescribed minimal difference from the standard time constant decaying voltage. At that time, a particular detent phase is selected, together with the lagging phase, the lagging phase then being applied for a prescribed period of time, and then being dropped so that the selected phase acts to detent the motor at a particular pole.

When the motor is operated in step mode, the rotational phase is selected and the motor begins to rotate. Then a tachometer pulse is received and a one-shot, Schmidt trigger circuit is activated. When the one-shot circuit operates, a lagging phase is selected. When the oneshot circuitry is deactivated by reason of being timed out, the lagging phase is deactivated and the motion phase is again activated so that the motor detents at the desired pole. When the printer is operating in the "print" mode, printing is accomplished and then the next sequential motion phase is selected.

The friction between the printhead and the paper upon which the printing is done varies depending upon the composition of the paper, temperature, humidity, etc. If the friction is small, then the head moves more rapidly and therefore greater braking current is required. A velocity detection circuit is employed to add more current to the lagging phase when the motion is more rapid. Conversely, when the friction is high and the motion is slower, the circuit decreases the current flow into the lagging phase motor coil.

The main object of this invention is to provide a dynamic braking mechanism for an inductively controlled stepper motor for stopping the rotation of the motor in either direction smoothly, with a minimal amount of circuitry.

Other objects of this invention will be evident in the detailed description that follows.

DETAILED DESCRIPTION OF THE INVENTION

Figure 1A:
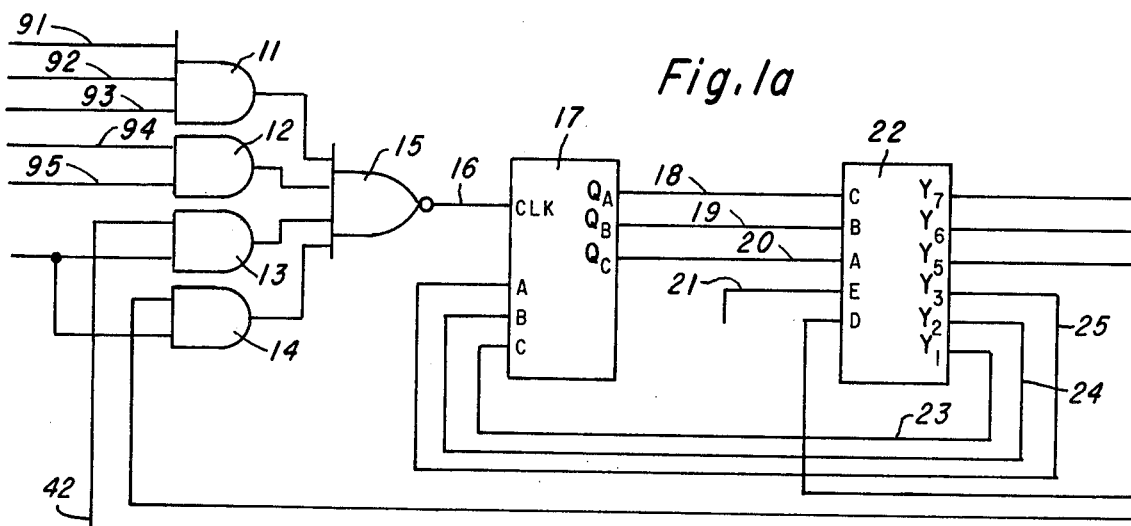
FIGS. 1a and 1b comprise a logic diagram of the control system.
Figure 1A:
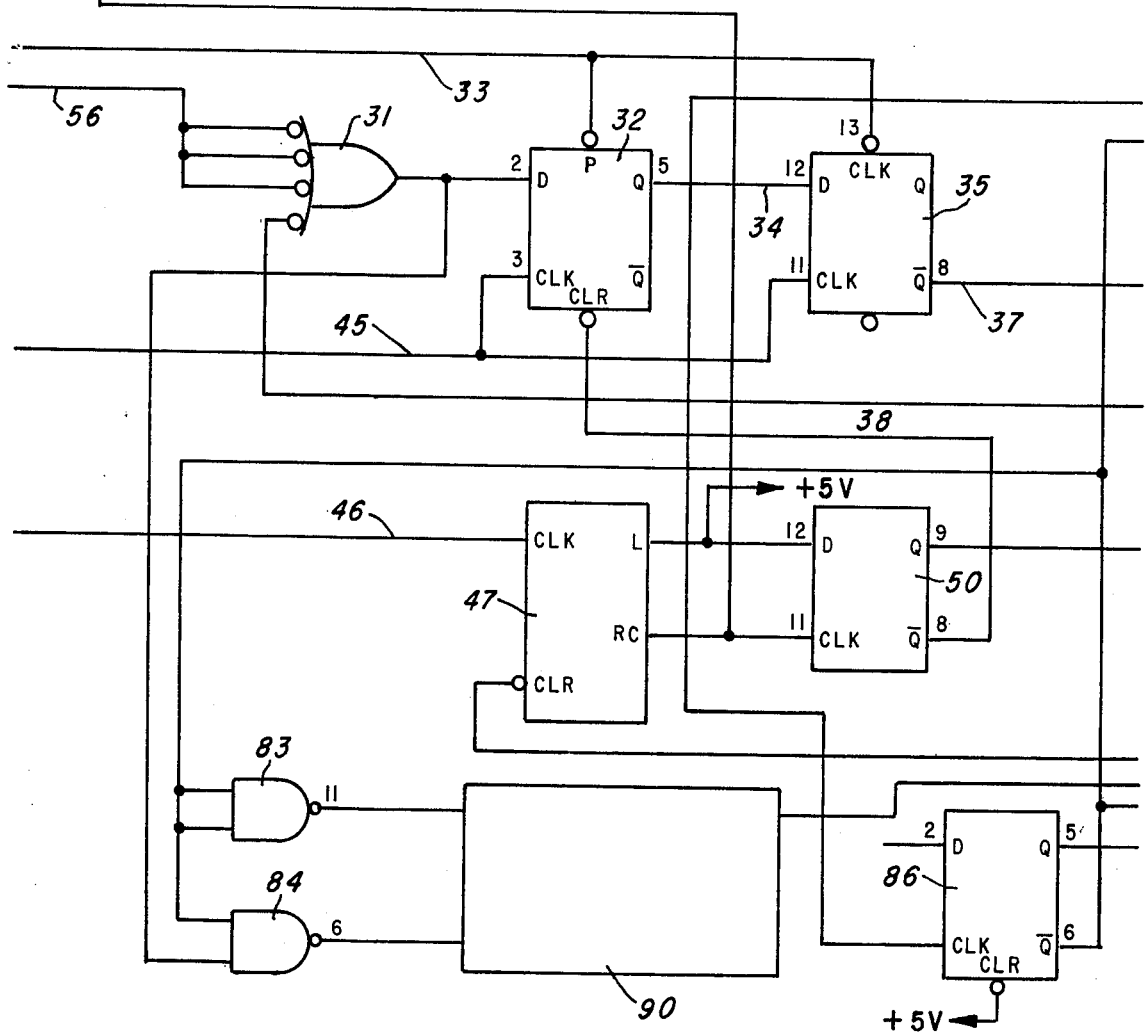
Figure 1B:
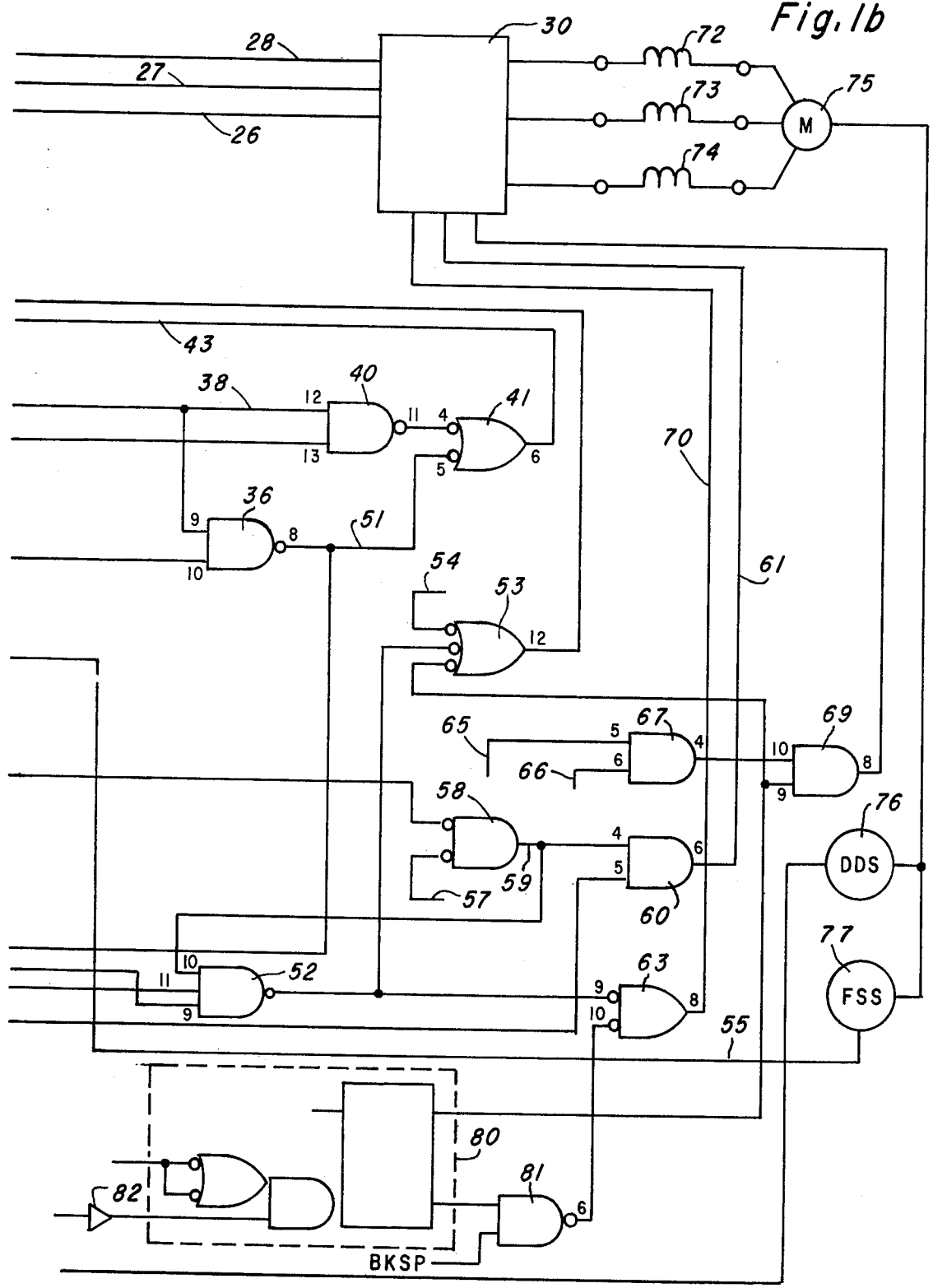

Referring first to FIG. 1, NOR circuit 15 is shown having AND circuits 11, 12, 13, and 14 as inputs. Inputs to the AND circuits 11–14 are function selection type inputs and are also timing inputs. For example, input lines 92, 93, and 94 provide timing inputs that all come from an electronic timing mechanism (not shown). Such mechanisms are well known in the prior art. In this preferred embodiment, a Texas Instruments Incorporated Type TI-74175 circuit is employed. This circuitry is well known and need not be shown here. Inputs 91, 95, and 96 provide function selections depending upon the mode of operation required. The output of NOR circuit 15 provides a "Head Clock" which is provided on conductor 16 to the clock input of flip-flop 17. Flip-flop 17 has outputs $Q_A$, $Q_B$, and $Q_C$ which are connected as inputs on conductors 18, 19, and 20 respectively, to Read-Only-Memory (ROM) 22, terminals C, B and A, respectively. Additional input D of ROM 22 is provided on conductor 43 at an output of NAND circuit 53, this input causing a lagging phase selection.

Input E of ROM 22 is provided on conductor 21 and comes from a counter which digitally counts increments of rotation of motor 75 as translated from rotational motion to linear motion, thereby counting columns. The counter is an up/down digital counter well known in the prior art. In this preferred embodiment, Texas Instruments Incorporated TI-74191 circuit is utilized. The ROM 22, in this preferred embodiment, is a Texas Instruments Incorporated TI-7488A circuit. ROM 22 has six outputs, Y1-Y7. Y1, Y2, and Y3 outputs are brought out on conductors 23, 24, and 25 respectively. Conductor 25 is connected to flip-flop A section, conductor 24 is connected to flip-flop B section and conductor 23 is connected to flip-flop C section, all of flip-flop 17. The outputs Y5-Y7 of ROM 22 are brought out on conductors 26, 27, and 28 respectively, serving as inputs to the motor drive circuit 30 for selection and activation of motor coils 72, 73, and 74 diagrammatically shown connected to the motor drive circuitry 30 and to motor 75. Motor 75 is shown having two rotational detectors 76 and 77 connected thereto. The output of detector 76 serves as an input to amplifier 82, which in turn is connected to one-shot Schmidt trigger circuit 80. Circuit 80 is well known in the prior art and in the preferred embodiment is a Texas Instruments Incorporated TI-74121 circuit. Detector 77 has an output connected to NAND circuit 31 by way of conductor 55. NAND circuit 31 also has a function selection input entitled Select A. The output of NAND circuit 31 serves as an input to the D terminal of flip-flop 32 and as an input to NAND circuit 84. Function selection line 33 which carries the "return" function is connected to the $\overline{P}$ input terminal of flip-flop 32 and to the $\overline{CLR}$ input terminal of flip-flop 35 whose D input is connected to the Q output of flip-flop 32 via conductor 34. The Q output of flip-flop 32 is also connected to the clock input of flip-flop 86 and to the input terminal of NAND circuit 36 and to an input terminal of NAND circuit 40. The $\overline{Q}$ output of flip-flop 35 is connected via conductor 37, as an input to NAND circuit 36. A system clock (not shown) is applied via line 45, providing a frequency of 12.8 KHz as a clock input to each of flip-flops 32 and 35. A $\overline{CLR}$ input to flip-flop 32 comes from the $\overline{Q}$ output of flip-flop 50.

The output of NAND circuit 40 serves as an input to NAND circuit 41 whose other input is provided by the output of NAND circuit 36 via line 51. The output of NAND circuit 36 also serves as a clear input to counter 47 which has a clock input provided on line 46 from the system clock divided to provide a frequency of 800 hertz. Counter 47 is a counter circuit well known in the prior art, and serves as a "fail-safe" counter. In the preferred embodiment, this counter is a Texas Instruments Incorporated type TI-74161 circuit.

The RC output serves as the CLK input to flip-flop 50. The Q output of flip-flop 50 serves as an input to NOR circuit 58. The other input to NOR circuit 58 is provided on line 57 and is a function selection known as return. The output of NOR circuit 58 serves as an input to AND circuit 60 via line 59 and as an input to NAND circuit 52. The RC output of counter 47 is also connected, via line 42, to AND circuit 13 as the function selection of left-to-right motion.

The output of NAND circuit 41 serves as an input, via line 43 to AND circuit 14 as a carriage return function selection.

The output of NAND circuit 52 serves as an input to NAND circuit 63 and as an input to NAND circuit 53.

Another input to NAND circuit 52 is provided from comparison circuitry 90. A third input to NAND circuit 52 is provided by the $\overline{Q}$ output of flip-flop 86 which also serves as an input to NAND circuit 83 and NAND circuit 84, the outputs of which serve as inputs to comparison circuitry 90. The second input to NAND circuit 53 is provided by the $\overline{Q}$ output of one-shot circuit 80. The third input to NAND circuit 53 is provided on conductor 54 and is identified as "Home". The output of NAND circuit 53 is connected to the D input of ROM 22, causing a lagging phase to be selected when a "1" signal is present. A "1" is arbitrarily selected as a binary designation when the voltage out is high, with a binary "0" representation being arbitrarily made when the voltage out is low.

The Q output of one-shot circuit 80 is connected as an input to NAND circuit 81 whose other input is a function selection of "back space". The output of NAND circuit 81 serves as the other input to NAND circuit 63 whose output serves as an input on line 70 to head phase control (HPC).

The Q output of flip-flop 86 serves as the other input to AND circuit 60 whose output on conductor 61 serves as a second input to HPC.

NOR circuit 67 is provided with a current timing pulse on input line 65 and with a function selection of "right-to-left" on input line 66. The output of NOR circuit 67 serves as an input to AND circuit 69 whose other input is provided by the $\overline{Q}$ output of one-shot circuit 80. The output of AND circuit 69 serves as a third input to HPC.

Figure 2:
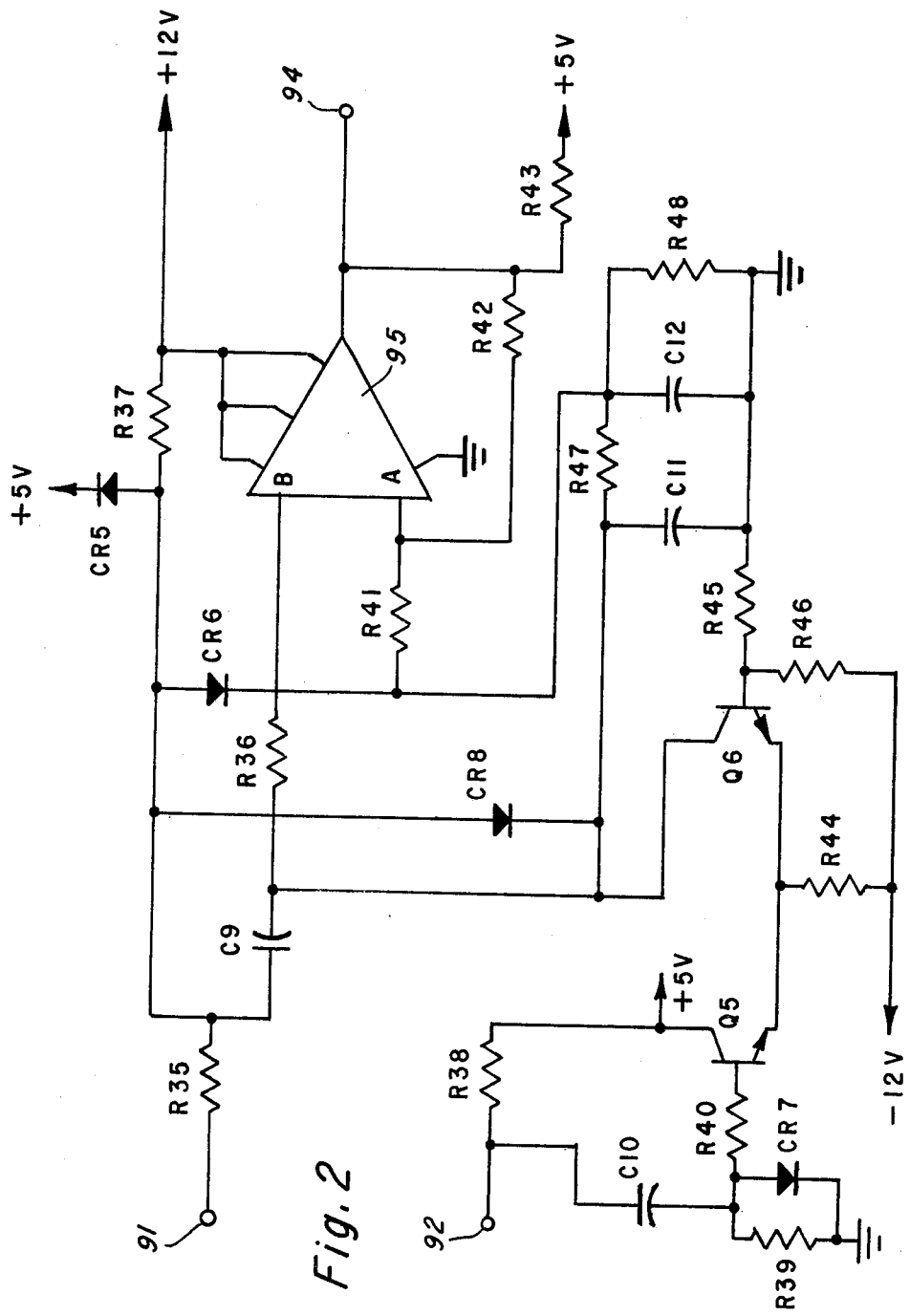
FIG. 2 is a schematic diagram of the carriage return comparison circuit.

FIG. 2 schematically illustrates the carriage return comparison circuit 90. Input pins 91 and 92 are connected, respectively, to the outputs of NAND circuits 83 and 84. Terminal 91 is connected to one end of resistor R35, whose other end is connected to one terminal of capacitor C9 and to a junction between the anodes of diodes CR5, CR6 and CR8, and resistor R37 whose other end is connected to a source of 12 volts. The other terminal of capacitor C9 is connected to one end of R36, whose other end is connected as one input to comparator amplifier 95. The other terminal of capacitor C9 is also connected to the cathode of diode CR8, the collector of transistor Q6, one terminal of capacitor C11 and to one end of resistor R47. The other end of R47 is connected to a junction between one end of resistor R41, the cathode of diode CR6, one terminal of capacitor C12 and one end of resistor R48. Capacitor C12 and resistor R48 have their other ends tied to ground and serve as the standard time constant circuit. Capacitor C11 and one end of resistor R45 are tied to ground, with the other end of resistor R45 being connected to the base of transistor Q6 and to one end of resistor R46 whose other end is connected to a source of −12 volts. The emitter of transistor Q6 is connected to resistor R44 whose other end is connected to the −12 volt source. The emitter of transistor Q6 is also connected to the emitter of transistor Q5 whose base is connected to one end of resistor R40, the other end of resistor R40 being connected to a junction between the anode of diode CR7, one terminal of capacitor C10 and one end of R39. The other end of R39 and the cathode of diode CR7 are tied together to ground and the other terminal of C10 is connected to input terminal 92. The collector of transistor Q5 is connected to a source of +5 volts and to one end of resistor R38 whose other end is connected to terminal 92. As will be described later, transistor Q5 and transistor Q6, together with associated circuitry, provide the function of the measuring voltage.

Figure 3:
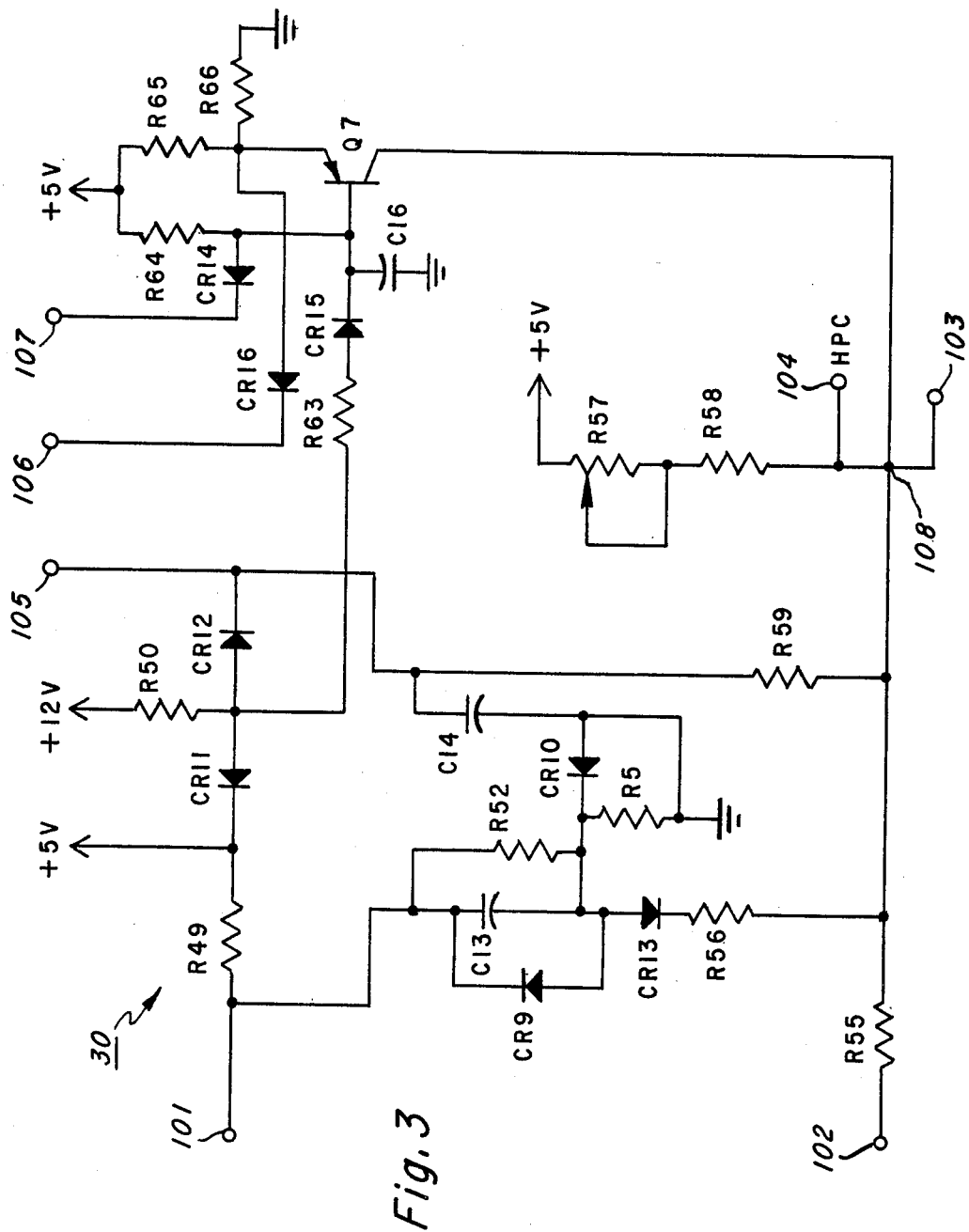
FIG. 3 is a schematic diagram of a programmed current circuit, included in the motor drive circuitry.

FIG. 3 schematically shows the circuit for programming the amount and shape of current to be sent into the appropriate motor coil or coils. This circuit is included in the motor driver circuit 30 of FIG. 1.

Input terminal 101 is connected to the output of NAND circuit 60 whose function is to cause additional current to flow into the motor coils representing the lagging phases, when a dynamic braking function during a carriage return is being performed. Input terminal 101 is connected to the junction of resistors R49 and R52, one terminal of capacitor C13 and the cathode of diode CR9. The other end of resistor R52 is connected to the other terminal of capacitor C13 and to the anode of diode CR9, the anode of diode CR13, one end of resistor R5 and the cathode of diode CR10. The anode of diode CR10 and the other end of resistor R5 are connected to ground. The cathode of diode CR13 is tied to one end of resistor R56 whose other end is connected to one end of resistor R55, one end of resistor R59, terminals 103 and 104 and one end of resistor R58. One terminal of capacitor C14 is tied to ground while the other terminal is connected to the other end of resistor R59, to the cathode of diode CR12 and to terminal 105. The anode of diode CR12 is connected to the junction of resistors R50 and R63 and the anode of diode CR11. The other end of R50 is tied to +12 volts. The cathode of diode CR11 is tied to +5 volts. The other ends of resistors R56 and R59 are tied together to the junction 108 of terminals 103 and 104 and to one end of resistor R58. The other end of R58 is tied to variable resistor R57 whose other end is tied to +5 volts.

Also, connected to junction 108 is the collector of transistor Q7, whose base is connected to one terminal of capacitor C16 whose other terminal is grounded. The base of transistor Q7 is also connected to the anode of diode C14 and one end of resistor R64 whose other end is connected to +5 volts. The emitter of transistor Q7 is tied to the junction between resistors R65 and R66, the other end of R66 being tied to ground and the other of R65 being tied to +5 volts. The cathode of CR14 is connected to terminal 107. The emitter of transistor Q7 is also connected to the anode of diode CR16 whose cathode is connected to terminal 106.

MODE OF OPERATION

Figure 4:
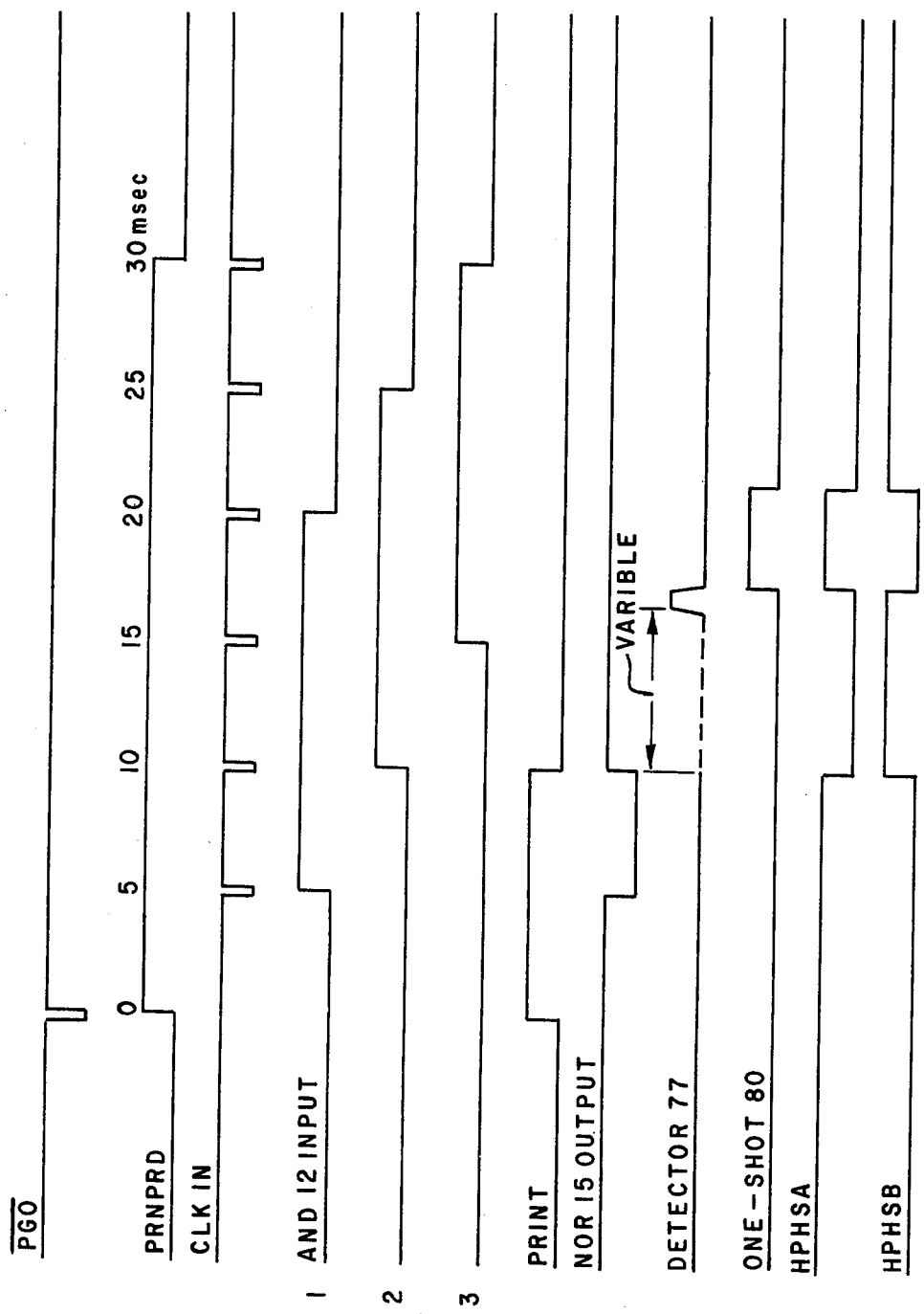
FIG. 4 is a chart illustrating the activation of the phases of the stepper motor required for forward and reverse stepping motion and for continuous rotation, together with the lagging phases activated for retrotorquing of all of the forward and reverse motions.

FIG. 1 illustrates the preferred embodiment of the logic configuration used to move the thermal printhead of a thermal printing system. Reference should also be made to FIG. 4 which illustrates the electronic timing sequences utilized.

The signal from, for example, the controller of the thermal printer, is shown as "PGO" in FIG. 4. When the signal provides a negative pulse as shown, a flip-flop (not shown) is set resulting in an output printer period waveform (PRNPRD) shown in FIG. 4. The preferred embodiment illustrates a printer period of 30 milliseconds. This period of time enables the printer to print and to move the printhead to the next position. The counter, referred to with respect to the description of FIG. 1 as typically a Texas Instruments type TI-7497 provides the waveform labeled "CLK IN". This "CLK IN" signal is used as the clock input to a plurality of flip-flops, referred to with respect to the description of FIG. 1 as typically a Texas Instruments type TI-74175 circuit. By appropriate interconnection of the flip-flops, it can be seen on FIG. 4 that the waveform entitled "AND 12 Input", which is the output of a first flip-flop, remains a "1" for 15 millseconds, milliseconds, followed 5 milliseconds later by a second flip-flop output which also remains a "1" for 15 milliseconds and finally followed by a third flip-flop output which remains a "1" for another 15 milliseconds, delayed 5 milliseconds. Note that when the third flip-flop goes from "1" to "0" the flip-flop providing the "PRNPRD" waveform is cleared, resulting in ending the printer period. The waveform entitled "PRINT" is of interest in that it illustrates that the actual printing is done between times 0 and 10 milliseconds, after which the printhead is immediately moved. The waveform entitled "HPHSA" represents the activation of motor coil, phase A. As will be described later, the currents actually provided for the motor coils are quite complex and therefore this waveform is not representative. "HPHSA" is shown as being a 1 until time 10. This illustrates that the motor was held in detent position in phase A. At the end of the print operation, phase A is dropped and phase B, which is waveform "HPHSB" is activated as shown, going from "0" to "1". Then, a pulse comes from the tachometer shown as waveform "DETECTOR 77". It does not come at a precise time, as illustrated. When an output is received from detector 77, the one-shot circuit 80 is activated as shown. As will be described, this causes "HPHSA" to once again be activated and for "HPHSB" to be deactivated. At time 10, "HPHSB" had been activated to cause rotation of the motor. When one-shot 80 is activated, the lagging phase which is "HPHSA" is also activated to provide retrotorque to the motor. At approximately time 19, the one-shot circuit 80 is timed out, resulting in the deactivation of lagging phase "HPHSA". Then "HPHSB" is again activated to cause the motor to detent at the desired pole.

Now with specific reference to FIG. 1, output of NOR circuit 15 provides a clock input into flip-flop circuit 17. This further causes the contents of flip-flops A, B, and C to be transferred over lines 18, 19 and 20 respectively, to ROM 22, inputs C, B, and A respectively. Reference should be made to the table below to understand the relationship of the inputs of ROM 22 to the phase selection and to further selection of the inputs.

TABLE I

| WORD | INPUTS | | | | | OUTPUTS | | | | | |
|---|---|---|---|---|---|---|---|---|---|---|---|
| | A | B | C | D | E | $Y_1$ | $Y_2$ | $Y_3$ | $Y_5$ | $Y_6$ | $Y_7$ |
| 0 | 0 | 0 | 0 | 0 | 0 | 1 | 0 | 0 | 1 | 0 | 0 |
| 1 | 1 | 0 | 0 | 0 | 0 | 0 | 1 | 0 | 0 | 1 | 0 |
| 2 | 0 | 1 | 0 | 0 | 0 | 0 | 0 | 1 | 0 | 0 | 1 |
| 4 | 0 | 0 | 1 | 0 | 0 | 1 | 0 | 1 | 1 | 0 | 0 |
| 5 | 1 | 0 | 1 | 0 | 0 | 0 | 1 | 1 | 0 | 1 | 0 |
| 6 | 0 | 1 | 1 | 0 | 0 | 0 | 0 | 0 | 0 | 0 | 1 |
| 7 | 1 | 1 | 1 | 0 | 0 | 0 | 0 | 0 | 1 | 0 | 0 |
| 8 | 0 | 0 | 0 | 1 | 0 | 1 | 0 | 0 | 0 | 0 | 1 |
| 9 | 1 | 0 | 0 | 1 | 0 | 0 | 1 | 0 | 1 | 0 | 0 |
| 10 | 0 | 1 | 0 | 1 | 0 | 0 | 0 | 1 | 0 | 1 | 0 |
| 12 | 0 | 0 | 1 | 1 | 0 | 1 | 0 | 1 | 0 | 0 | 1 |
| 13 | 1 | 0 | 1 | 1 | 0 | 0 | 1 | 1 | 1 | 0 | 0 |
| 14 | 0 | 1 | 1 | 1 | 0 | 0 | 0 | 0 | 0 | 1 | 0 |
| 15 | 1 | 1 | 1 | 1 | 0 | 0 | 0 | 0 | 1 | 0 | 0 |
| 16 | 0 | 0 | 0 | 0 | 1 | 0 | 1 | 1 | 1 | 0 | 0 |
| 17 | 1 | 0 | 0 | 0 | 1 | 0 | 0 | 0 | 0 | 1 | 0 |
| 18 | 0 | 1 | 0 | 0 | 1 | 1 | 0 | 0 | 0 | 0 | 1 |
| 20 | 0 | 0 | 1 | 0 | 1 | 0 | 1 | 0 | 1 | 0 | 0 |
| 21 | 1 | 0 | 1 | 0 | 1 | 0 | 0 | 1 | 0 | 1 | 0 |
| 22 | 0 | 1 | 1 | 0 | 1 | 1 | 0 | 1 | 0 | 0 | 1 |
| 23 | 1 | 1 | 1 | 0 | 1 | 0 | 0 | 0 | 1 | 0 | 0 |
| 24 | 0 | 0 | 0 | 1 | 1 | 0 | 1 | 1 | 1 | 0 | 0 |
| 25 | 1 | 0 | 0 | 1 | 1 | 0 | 0 | 0 | 0 | 1 | 1 |
| 26 | 0 | 1 | 0 | 1 | 1 | 1 | 0 | 0 | 1 | 0 | 1 |
| 28 | 0 | 0 | 1 | 1 | 1 | 0 | 1 | 0 | 1 | 1 | 0 |
| 29 | 1 | 0 | 1 | 1 | 1 | 0 | 0 | 1 | 0 | 1 | 1 |
| 30 | 0 | 1 | 1 | 1 | 1 | 1 | 0 | 1 | 1 | 0 | 1 |

TABLE I-continued

| WORD | INPUTS | | | | | OUTPUTS | | | | | |
|---|---|---|---|---|---|---|---|---|---|---|---|
| | A | B | C | D | E | $Y_1$ | $Y_2$ | $Y_3$ | $Y_5$ | $Y_6$ | $Y_7$ |
| 31 | 1 | 1 | 1 | 1 | 1 | 0 | 0 | 0 | 1 | 0 | 0 |

Note that outputs $Y_1$, $Y_2$, and $Y_3$ of ROM 22 serve as inputs to flip-flops C, B, and A respectively, of flip-flop circuit 17. Referring to Table 1, note that in word 0, $Y_5$ corresponds to motor phase A, $Y_6$ corresponds to motor phase B and $Y_7$ corresponds to motor phase C. Word 0 therefore indicates that phase A has been selected. Note that in word 1, inputs A, B, and C correspond to the contents of $Y_1$, $Y_2$, and $Y_3$, respectively, from word 0. In word 1, note that $Y_6$, corresponding to phase B is activated, as expected. In word 2, inputs A, B, and C correspond to $Y_1$, $Y_2$, and $Y_3$ from word 1 and phase C is selected. Progression continues until word 6 is reached, at which time $Y_1$, $Y_2$, and $Y_3$ are all "O"s, corresponding to A, B, and C of word 0. Therefore, following word 6, word 0 follows, and the cycle is repeated until interrupted. Note that word 7 contains all "1"s for inputs A, B, and C, which is a start position since the next word called for is word 0. Word 8 shows that input D has been activated after phase A was selected. Input D comes from NAND circuit 53, which in turn is activated by output of the one-shot circuit 80. As mentioned earlier, one-shot circuit 80 is activated to affect retrotorque braking. Therefore, in word 8, phase C, which lags phase A, is selected. As soon as the one-shot circuit 80 times out, input D goes to "0" and phase A is again selected to cause detent. Words 9–14 reflect other possible inputs of A, B, and C, with D a "1". A word-by-word comparison of words 0–7 with words 8–15 indicates that in each case, the lagging phase is selected in words 8–15.

Words 16–23, with E a "1", provide a reverse rotation of the motor, or a right-to-left motion of the printhead. Word 22, it should be noted, activates phase C. Word 21 activates phase B and note that inputs A, B, and C correspond to outputs $Y_1$, $Y_2$, and $Y_3$ of word 22. Word 20 activates phase A and inputs A, B, and C correspond to outputs $Y_1$, $Y_2$, and $Y_3$ of word 21. Finally, at word 16, outputs $Y_1$, $Y_2$, and $Y_3$ correspond to inputs A, B, and C of word 22 and therefore recirculation occurs. Word 23 has A, B, and C inputs all "1"s with outputs $Y_1$, $Y_2$, and $Y_3$ all " "s by selecting word 16 from a start equipment position.

Words 24–31 each contain B and E as "1"s. Input E was activated in words 16—by the right to left function control (not shown). In "the carriage return" mode input D of ROM 22 is activated from the output of NAND circuit 53 as a result of the output of NAND circuit 52 being activated by the comparator circuit 90, the operation of which is described below.

Starting at word 30, note that inputs A, B, and C correspond to inputs A, B, and C of word 22. Note that word 22 selects phase C. Word 30 selects two phases. This will be explained fully below. Now, when input D goes to "1", as shown in word 30, lagging phase A is selected as well. Likewise, word 29 corresponds to word 21, except for the dynamic braking requirement which, in word 29, causes not only phase B to be activated, but lagging phase C. A word-by-word comparison of words 30–24 with words 22–16 indicates that in each case an additional phase is selected in words 30–24, that phase being lagging with respect to the selected phase for a reverse motion.

Figure 5:
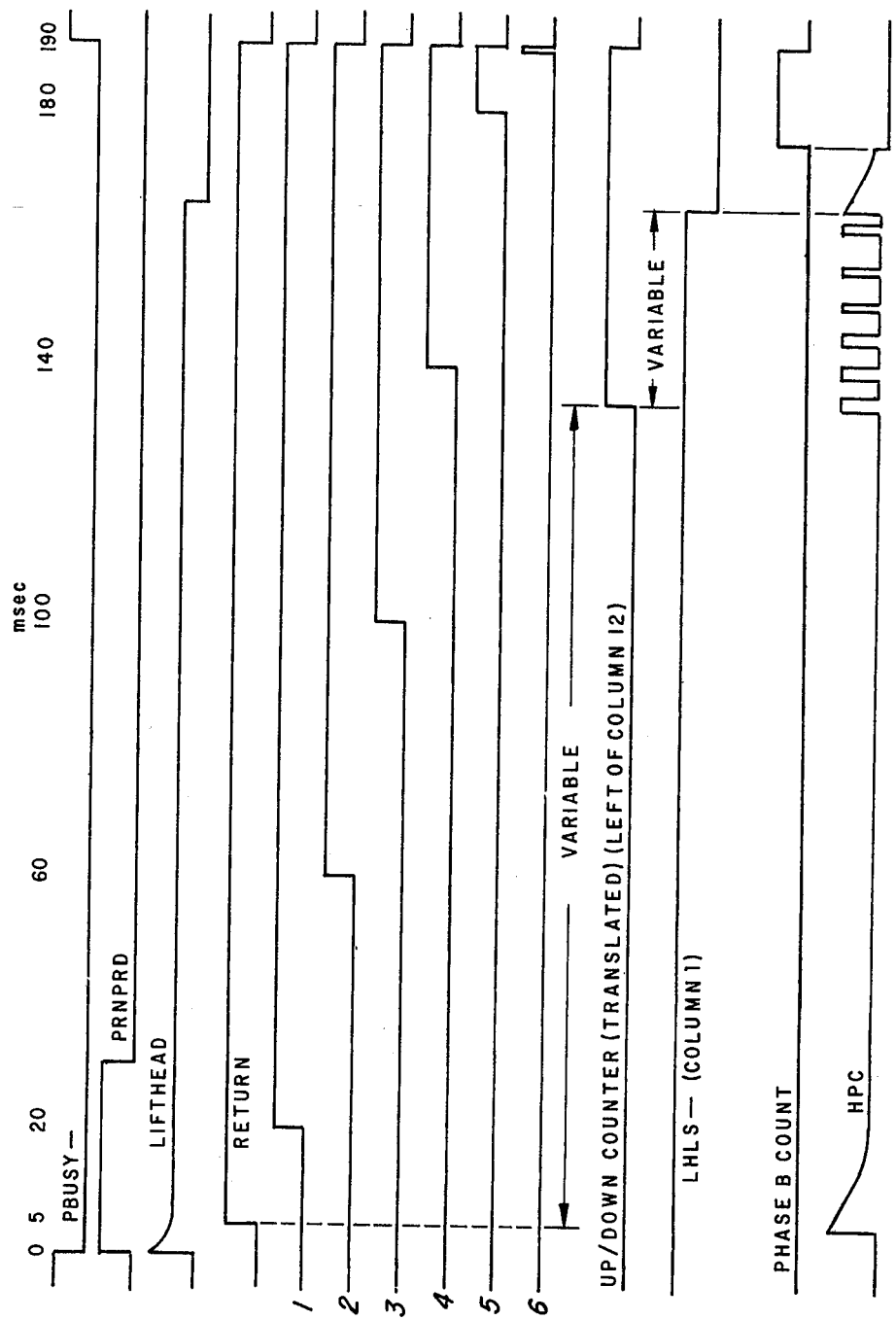
FIG. 5 is a timing chart, illustrating some of the time relationships within the control system.

As will be explained below, comparator circuit 90 is activated by the up/down counter arriving at column 12 count and if the velocity is high enough to produce an output from the comparator 90. A further refinement in the system is a circuit including a left hand limit switch which is activated at column 1 when the carriage return mode is active. Closing the switch activates other logic circuitry which then selects phase A and phase B. Phase B is selected for approximately 10 milliseconds. The signal from the left hand limit switch is combined with an output from the timer in a NAND circuit (not shown), the output of which is line 54, an input to NAND circuit 53. Activating NAND circuit 53 makes the D input of ROM 22 a "1". Since phase A has been selected, phase B is then also selected, and dropped when the timer reaches the end of the 10 millisecond period. Phase A had been selected by reason of the left hand limit switch being closed which then provided a "0" input to the CLR input of flip-flop circuit 17. Referring again to Table I, it can be seen that when inputs A, B, and C are all "O"s, phase A is selected. After phase B is dropped, phase A then causes the motor to detent, awaiting further left-to-right motion of the printhead. Reference should now be made to FIG. 5 which illustrates the timing involved. The left hand limit switch, is shown as waveform "LHLS-" being activated at time 180.

The top wave form entitled "PBUSY" indicates the 190 millisecond time period and is indicative of the printer being operated. The "PGO" waveform, shown in FIG. 4, together with "DCR" logic signal (not shown) initiates the carriage return. Note that a "LIFT HEAD" activation signal starts at time 0, rising to a relatively high level to move the lift head, via a solenoid, off the paper rapidly. Then the current settles down to a fixed level until column 1 is reached, at which time the lift signal is dropped. Input signal DCR from, for example, a controller, alternately sets a flip-flop whose output is used to remove the clear from a shift register (not shown) but typically a Texas Instruments type TI-74164. Removing the clear from the shift register results in an output shown in FIG. 5 as waveform "RETURN". The return output, on line 33 in FIG. 1 serves to remove the clear from flip-flops 32 and 35. This output is inverted and used as an input to a rate multiplier (not shown), typically a Texas Instruments type 7497. By employing known interconnection between the shift register and the rate multiplier, varying time sequences can be made available. Waveforms 1–6 all come from the shift register as interconnected with the rate multiplier. As can be seen, the combinations provide for the appropriate time periods to ultimately end the entire carriage return cycle after 190 milliseconds.

As in the case of the printing mode, described in connection with FIG. 4, there is an output signal from NORGATE 15 resulting from command inputs on lines 94 and 95 to AND circuit 12. The difference, of course, is that when the carriage return is initiated at the far right side, 80 columns must be traversed and, therefore, the waveform from NOR circuits 15 is not shown. However, it operates with respect to the flip-flop circuit 17 in the same fashion as described with respect to the printing mode. That is, every time a pulse from circuit 15 clocks the flip-flop circuit 17, information is transferred into ROM 22. Dynamic braking is not done until the up/down counter which has been counting in reverse reaches column 12.

When column 12 is reached, the system will react to the position detector 77 which is synced with the command Select A on line 56, causing the output of NAND circuit 31 to go to "1". The output NAND circuit 31 also sets flip-flop 32, which in turn sets flip-flop 35. The Q output of flip-flop 32 clocks the flip-flop 86. The D input to flip-flop 86 receives a signal, ultimatey from the up/down counter, representative of column 12 having been reached. Its Q output, now a "1" is used as inputs for NAND circuits 83 and 84, causing the outputs of each to go to "0", activating the comparison circuit as described below. The comparison circuit provides a "1" output so long as the reference input is greater than the measuring input to the comparator, as described below.

It can be seen that the motor current labeled "HPC" in FIG. 5 starts up very high when the "RETURN" signal is activated, decays to a level just enough to overcome the friction losses in the motor system and then pulses as shown may or may not occur when the curve representing the up/down counter output reaches column 12. As indicated above, in this condition, two phases are selected rather than one. The phases are selected in accordance with the ROM 22 functions. Note that flip-flop 32 has a Q output that is used to condition NAND gates 36 and 40. NAND gate 40 receives an input from the Q output of Flip-flop 86. This connection selects the trailing edge of the pulse from detector 77. Therefore, the positive transition at the output 16 of NOR circuit 15 selects the next phase with a reduced phase lead. This is done to provide a more effective brake function after column 12 has been reached. NAND gate 52 provides a "0" out which causes NAND gate 53 to provide a "1" output serving as the D input over line 43 to ROM 22, thereby selecting the lagging phase. Also, NAND gate 52 provides a "0" input to NAND gate 63 which provides a "1" output, causing additional current to flow into the current programming circuit described below. This mode of operation continues in accordance with Table I until comparator 90 produces a "0" output. Then, when the left hand limit switch is closed as shown in FIG. 5 as waveform "LHLS-", phase A is selected, the "Home" phase with phase B also being selected at the same time as shown in the waveform "phase B count", with phase B then being dropped to end the "carriage return" mode, with the motor detenting on phase A.

The "back space" mode operates much like the print mode, except that there is no initial 10 millisecond print period and two phases are selected for dynamic braking as in the "carriage return" mode. A back space control signal "DBS" comes from, for example, a controller and ultimately sets a flip-flop which provides an output signal which is used as an input to AND circuit 11 on input line 91. It also serves as a conditioning input to NAND circuit 81, whose other input is connected to the Q output of one-shot circuit 80. The counter used to provide the printer period for the printing mode is used to provide the same period for the "back space" mode. The output from the counter serves as an input, together with the back space input from the flip-flop set by the "DBS" input signal, provides a head clock output from NOR circuit 15. Again, NOR circuit 15 is used to transfer the contents of flip-flops A, B, and C of flip-flop circuit 17 to ROM 22. Of course, as in the "carriage return" mode, the up/down counter is counting down and therefore input E of ROM 22 is activated. When a pulse comes from detector 76, it triggers the one-shot circuit 80 as in the print mode. NAND circuit 81 then provides a "0" input to NAND circuit 63, causing a "1" output, causing current to flow through the motor coils via the current programming circuitry described below. Also, the output of AND circuit 69 provides a "0" out to the input of NAND circuit 53, which, with a "1" output resulting, selects the lagging phase input D of ROM 22. With inputs D and E both "1"s, ROM 22 selects the phases as shown in Table I, words 30–24.

A system clock coming from, for example, a controller is used to synchronize all required functions in a well known manner and has not been shown in detail. Explanations below, with respect to FIGS. 2 and 3, fully explain the remaining details of this invention.

ROM 22, as described, selects the particular phases to be activated. A co-pending Patent Application, Ser. No. 452,320, filed Mar. 18, 1974, entitled "Switching Regulator Controller for Inductively Controlled Electro-Mechanical Device" by William Voigt, assigned to the assigned to the assignee of this invention, fully describes the switching circuitry within the switching regulator control for actually selecting the coil or coils of the motor. The switching regulator, as stated herein, is connected to the current programming circuit.

The reference or standard ramp voltage is provided by charging capacitor C12, as shown in FIG. 2, to a voltage of approximately 4.5 volts and then discharging capacitor C12 through resistor R48. When the column counter reaches 12 in the carriage return mode, then the Q output of flip-flop 86 goes to "0" and the $\overline{Q}$ output goes to "1". The $\overline{Q}$ output is then present on both inputs of NAND circuit 83 and on one input of NAND circuit 84. This provides a "0" output on both NAND circuits 83 and 84. Prior to the count reaching column 12, the current path from +12 volts through R37 and through diode CR6 to C12 and through R47 to C11 provided approximately 5.0 volts charge on both of those capacitors. Diode CR5 is simply a clamp to prevent the voltage at that point from rising beyond 5.8 volts. When a "0" is presented at terminal 91 by way of NAND circuit 83, diode CR6 is no longer forward biased and therefore capacitor C12 is then able to discharge through R48. R47 is placed between C11 and C12 to keep the voltage difference within a reasonable range.

Terminal 92 goes to a "0" because of conditioning NAND circuit 84 with a "0" input so that the pulse received from the position indicator 77 is effectively passed through NAND circuit 84 to input pin 92. Capacitor C10, in combination with resistor R39, forms a differentiator. The circuit clamps the positive differentiation and lets the negative differentiation turn off transistor Q5. When transistor Q5 turns off, transistor Q6 is turned on for the time width of the differentiation determined by the threshold that is established by R45 and R46, forming a voltage spike. When Q6 is turned on, it tends to act as a constant current sink, permitting C11 to discharge through the emitter circuit, through R44 to −12 volts. If the motor shaft is turning faster than the required velocity for effective braking, the differentiated pulses will occur closer together and this will cause C11 to discharge to −12 volts at a faster rate than C12 is discharging through R48 to ground. When this situation exists, comparator input pin B is negative with respect to comparator input pin A. Since pin A of comparator 95 is the negative input, the output will be inverted and therefore is a "1". This "1" output is presented at output terminal 94 to NAND circuit 52, causing its output to go to "0", which in turn causes the output of NAND circuit 63 to go to a "1" causing more current to flow in the appropriate lagging phase motor coils. Also, the "0" output of NAND circuit 52 is applied as an input to NAND circuit 53, providing a "1" output which is applied to the ROM 22 at input pin D, causing the selection of lagging phases as described above.

Of course, when the differential pulses applied to transistor Q5 become farther apart in time, the inputs to comparator amplifier 95 tend to equalize and when they do, the output of comparator amplifier 95 will go to a "0" and the lagging phase selection pin D of ROM 22 will be deactivated and the higher brake current provided by NAND circuit 63 will no longer be provided.

Referring now to FIG. 3, the operation of the programmed current circuit will be described. The printing mode operation will be described first and is initiated when the output of AND circuit 69, which is connected to input terminal 105, switches from "0" to "1". As the voltage rises at terminal 105, current flows from AND circuit 69 into C14, charging that capacitor. The charge voltage at C14 is transmitted through R59 to junction 108. At that point, it is applied to a switching regulator circuit through terminals 103 and 104. The switching regulator circuit is a circuit which employes the selected coil or coils as the inductance in the switching regulator circuit itself and is fully described in Patent Application Ser. No. 452,320, filed Mar. 18, 1974 and assigned to the Assignee of this application. Capacitor C14 then provides a rising voltage until such time as the one-shot Schmidt trigger circuit 80 is turned on in the normal course by receiving a pulse from position indicator 76. At that time, the output of AND circuit 69 switches from "1" to "0". This provides a rapid discharge path for capacitor C14, thereby decreasing the amount of current available for the motor coil associated with the lagging phase, selected in the normal course of the printing mode when the one-shot circuit 80 is activated. When one-shot circuit 80 is timed out, the output of AND circuit 69 again switches to a "1", again causing capacitor C14 to begin charging up. Charging C14 provides additional current at junction 108, this time to affect detent. When one-shot circuit 80 times out, the motor rotor has almost reached the intended pole, and by adding current through the coil associated with the selected phase, detent is rapidly and smoothly achieved.

To aid in the braking during the printing mode, a supplemental, velocity sensitive, braking circuit operates. When AND circuit 69 switches its output from "0" to "1", current will flow from the +12 volt supply through resistors R50 and R63, and through diode CR15 to capacitor C16, charging that capacitor. As capacitor C16 is charging, the one-shot circuit 80 is triggered, causing its output, connected to input terminal 106, to go to "0", thus providing a current path through diode CR16 and thus enabling transistor Q7. The potential applied to the base of Q7 is supplied by capacitor C16. If the head velocity is relatively high because of low friction between the head and the printing medium, C16 will not have charged as high as if the velocity were low due to relatively high friction between the head and the printing medium. When, as expected, the velocity of head travel is high, the charge on capacitor C16 is low and therefore transistor Q7 conducts relatively heavily, with its collector connected to junction 108 for providing additional motor current. When the head velocity is low, the charge on capacitor C16 is relatively high, thus limiting the collector current from Q7 into junction 108 and into the motor coil.

In summary, the printing mode provides braking circuitry which is triggered by a single pulse from one-shot circuit 80 with a shaped current pulse available for the selected motor coil made larger or smaller in amplitude through the use of a velocity sensitive braking circuit.

The carriage return mode is activated by causing, in the normal course, the output of AND circuit 60 to go from "0" to "1". The output of AND circuit 60 is connected to input terminal 101 and therefore when the switch from "0" to "1" is proceeding, capacitor C13 performs a differentiation. That is, the charge on C13 cannot change instantaneously and therefore a large change is reflected at junction 108. This large change is required to provide rapid start-up of the motor to take the motor quickly through mechanical resonance. As the carriage return is proceeding, the charge on capacitor C13 has decayed to a smaller value. The voltage present at junction 108 is established by the DC voltage drop across resistor R49, resistor R52, diode CR13, and resistor R56, providing a small current, only slightly more than the current required to hold the motor is detent, just enough additional current to overcome the frictional losses.

The binary column counter then reaches a count of 12, causing the output of AND circuit 60 to go to "0". Diode CR13 blocks the charge on C13 from junction 108 and therefore capacitor C13 discharges through diode CR9. If the comparator amplifier 95 of FIG. 2 is providing a "1" output at that time because of a sufficient voltage difference between inputs A and B as described above, the output of NAND circuit 63 switches from "0" to "1". More current is applied through terminal 102 and R55 because in the carriage return braking technique, two coils are selected and therefore more current is required. Current pulses are continually sent through the motor coils until the output from comparator amplifier 95 switches to "0". When the column counter reaches a count of 1, a left hand limit switch is activated, as described above, causing phase A to be selected, together with lagging phase B. Phase B is activated for a 10 millisecond period as determined by the timer circuit referred to in connection with the description of FIG. 1. When phase B is dropped, phase A pulls the motor into a detent position. The motor is then ready for another left-to-right printing function.

A back space function is also available which operates, as in the case of the carriage return, with two lagging phases applied to affect braking.

Those with ordinary skill in the art are aware that many changes in logic can be made within the scope of this invention. For example, the velocity sensitive braking circuit associated with the printing mode could most certainly be useful in the carriage return mode. Also, the various Texas Instruments Incorporated circuits listed are merely representative of the general type of circuit required, i.e., counter, timer, flip-flop, etc. Also, changes in logic such as the use of double inversion logic can readily be made without departing from the scope of this invention.

What is claimed is:

1. In an electro-mechanical motion control system having at least one inductively controlled multi-phase motor with at least one coil corresponding to each phase and having current programming circuitry for providing desired current waveforms to the coils of the multi-phase motor and having selecting means for selecting the desired motor coil or coils, a velocity-sensitive circuit for providing current, comprising:

(a) electronic switching means, having a first main electrode connected to the current programming circuitry, a second main electrode and a control electrode;

(b) charging means, connected to the control electrode and connected to a voltage source; and (c) a timing circuit, connected to the second main electrode, for enabling the electronic switching means to conduct current through its first main electrode in an amount dependent on the voltage on the charging means for a predetermined period of time.

2. The velocity-sensitive circuit of claim 1 wherein the electronic switching means comprise a transistor, the charging means comprise a capacitor and the timing circuit comprises a monostable one-shot circuit.

3. In a printer mechanism having a control system for moving the printhead of a printer by translating the rotation of an inductively controlled multi-phase motor to a linear motion, the motor having at least one coil associated with each phase, and the control system having current programming circuitry, a velocity-sensitive circuit for providing current, comprising:

(a) electronic switching means, having a first main electrode connected to the current programming circuitry, a second main electrode and a control electrode;

(b) charging means, connected to the control electrode and connected to a voltage source; and (c) a timing circuit, connected to the second main electrode, for enabling the electronic switching means to conduct current through its first main electrode in accordance with the amount of charge of the charging means for a predetermined period of time.

4. The velocity-sensitive circuit of claim 3 wherein the electronic switching means comprise a transistor, the charging means comprise a capacitor and the timing circuit comprises a monostable one-shot circuit.

5. An electro-mechanical motion control system having at least one inductively controlled multi-phase motor with at least one coil corresponding to each phase, for providing desired mechanical motion, comprising:

(a) drive circuit means including current programming circuitry, for providing current of a desired waveform and amplitude to the multi-phase motor;

(b) position sensing means for providing an electrical signal indicative of the angular position of the multi-phase motor;

(c) selecting means for selecting at least one phase of the multi-phase motor and electrically connecting the corresponding motor coil to the drive circuit means to cause the motor to rotate either in the forward or reverse direction; and (d) dynamic braking means connected to receive and responsive to the indicia signal, and connected to the selecting means to cause the selecting means to select at least one phase that lags the previously selected phase and to electrically connect the corresponding motor coil to the drive circuit means for a prescribed period of time, thereby providing the motor with the required retrotorque.

6. In a printer mechanism, a control system for moving the printhead of a printer by translating the rotation of an inductively controlled multi-phase motor to a linear motion, the motor having at least one coil associated with each phase, comprising:

(a) drive circuit means including current programming circuitry, for providing current of a desired waveform and amplitude to the multi-phase motor;

(b) position sensing means for providing an electrical indicia signal indicative of the angular position of the multiphase motor;

(c) selecting means for selecting at least one phase of the multi-phase motor and electrically connecting the corresponding motor coil to the drive circuit means to cause the motor to rotate either in the forward or reverse direction, thereby causing the printhead to move linearly, either right or left; and (d) dynamic braking means connected to receive and responsive to the indicia signal, and connected to the selecting means to cause the selecting means to select at least one phase that lags the previously selected phase and to electrically connect the corresponding motor coil to the drive circuit means for a prescribed period of time, thereby providing the motor with the required retrotorque.

* * * * *